(Model.)

H. MARSHALL & C. S. REINHART.
TRACE CARRIER.

No. 263,929. Patented Sept. 5, 1882.

WITNESSES:
J. E. Clark
P. B. Turpin

INVENTORS:
Howard Marshall
Caleb S. Reinhart
By R. S. & A. F. Lacey, Attorneys.

N. PETERS, Photo-Lithographer, Washington, D. C.

UNITED STATES PATENT OFFICE.

HOWARD MARSHALL AND CALEB S. REINHART, OF GOLDENDALE, WASHINGTON TERRITORY.

TRACE-CARRIER.

SPECIFICATION forming part of Letters Patent No. 263,929, dated September 5, 1882.

Application filed April 6, 1882. (Model.)

*To all whom it may concern:*

Be it known that we, HOWARD MARSHALL and CALEB S. REINHART, of Goldendale, in the county of Klikitat and Territory of Washington, have invented a new and useful Improvement in Trace-Carriers, of which the following is a full, clear, and exact description.

Our invention has relation to improvements in devices for supporting the traces on the horse when not hitched to a vehicle or plow; and it consists essentially in the peculiar construction of the trace-carrier, and in other improvements, all of which will be hereinafter fully described, and specifically pointed out in the claims.

The description and mode of operating is fully set forth in the annexed drawings.

Figure 1:
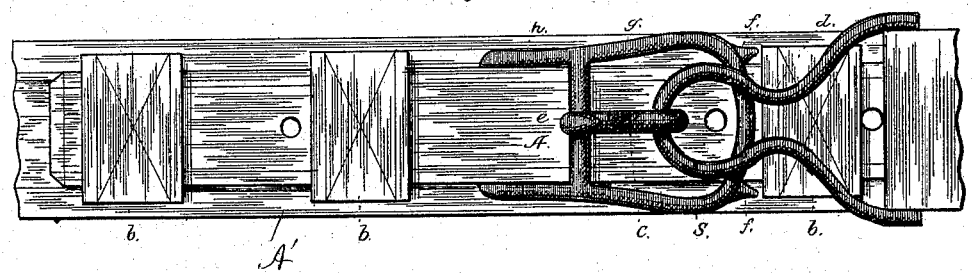
Figure 2:
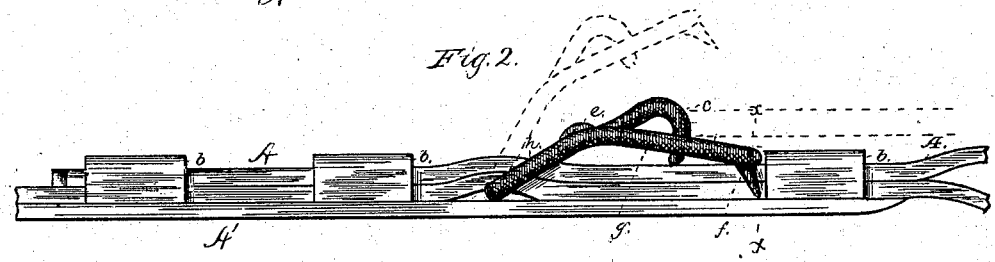
Figure 3:
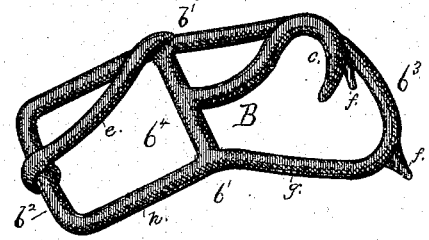
Figure 4:
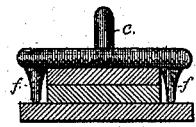

Figure 1 is a section of a back-pad with trace-carrier in its proper place and cockeye suspended. Fig. 2 is a section of back-pad in side view, less cockeye. Fig. 3 represents the model alone. Fig. 4 is a cross-section on line $x\,x$, Fig. 2.

Similar letters of reference indicate corresponding parts.

A represents the billet, connected to pad A' and carried down and back through the trace-carrying buckle, as will be described. This billet is narrower than the pad, and is placed on the same so as to leave a portion on either side, for the purpose hereinafter explained.

$b\,b$ represent keepers secured to pad A', and carried over billet A. The billet A is provided with suitable holes to receive the tongue of trace-carrier, hereinafter described.

B represents the trace-carrying buckle. $b'\,b'$ are the side bars of the frame of same. $b^2\,b^3$ are the end bars, and $b^4$ is an intermediate cross-bar extended from one to the other of the side bars, $b'$. The side bars, $b'$, are bent at the point where the cross-bar $b^4$ joins them into the form shown in Figs. 2 and 3, so that when they are applied to the billet A as will be described the central portion will stand on or above the billet, while the end bar $b^2$ and the supports hereinafter described are rested on the pad A'.

$c$ represents a hook having one end secured to the bar $b^4$ midway the side bars, $b'$, and having its opposite end carried toward the end bar, $b^3$, and bent up and then curved down and slightly toward the bar $b^4$, and rested slightly below the side bars, $b'$, as clearly shown in Fig. 2. The cross-bar $b^4$ divides the frame into the portions $h\,g$.

$e$ represents the tongue of the buckle. It is pivotally secured to end bar $b^2$ in line with hook $c$, and its point is extended to and rested on cross-bar $b^4$, as shown.

$f\,f$ are lugs or supports. They are extended down from the ends of end bar $b^3$, and are made long enough to rest down against the pad A' on either side of billet A when the end bar $b^3$ is rested down on the latter, as shown in Fig. 2. These supports provide a firm rest for the carrier on the pad A', and prevent any lateral movement of the carrier and secure it firmly in position. It will be understood that the end $b^3$ is, in operation, the lower end of the carrier.

The operation of the device will be readily understood on reference to the drawings. The billet is carried down through buckle and through lower keeper, then back through the keepers and buckle, the tongue $e$ being passed through the holes in billet, as shown in Fig. 1. The upper end of carrier is thus secured to the billet, with the bar $b^2$ rested on pad, while its lower end bar, $b^3$, is rested on the billet, and the supports $f\,f$ extend down on either side of the billet and bear on the pad. When it is desired to carry the trace the carrier is raised to the position shown in dotted line, Fig. 2. The cockeye $d$ of trace is inserted over the bar $b^3$ and under the point of hook $c$, and the carrier drops down in the position shown in full lines, Fig. 2, with the hook $c$ and end bar $b^3$ bearing on the billet and the supports $f$ bearing on the pad. The cockeye is rested down against end bar $b^3$, and is securely held by hook, as shown.

We are aware that trace-carriers adapted to be secured to the harness and provided with a hook having its point brought down to or nearly to the plane of the main frame of the carrier have been employed, and we do not broadly claim such construction as our invention.

We claim—

1. A trace-carrier composed of the side bars, $b'\,b'$, end bars, $b^2\,b^3$, and intermediate cross-bar, $b^4$, the end bars being bent as described at their point of connection with the intermediate cross-bar, the hook $c$, secured to middle of cross-bar $b^4$ and extended upward and forward toward end bar $b^3$ and curved back and down below the level of the side bars, $b'$ $b'$, the tongue $e$, secured to end bar $b^2$ in line with the hook $c$, and extended to and rested against bar $b^4$, and the supports $f\,f$, extended from the lower corners of the carrier and adapted to rest on either side of the billet and against the pad, substantially as and for the purposes set forth.

2. In combination with the billet A and pad A', made wider than the said billet, the trace-carrier B, constructed with the tongue $e$ and hook $c$, arranged substantially as described, and the supports $f\,f$, projected from the lower end of the carrier B, and extended down on either side of the billet A and bearing on the pad A', substantially as and for the purposes set forth.

In testimony whereof we have hereunto set our hands this 20th day of February, 1882.

HOWARD MARSHALL.
CALEB SPRINGER REINHART.

In presence of—
W. R. DUNBAR,
GEO. W. FILLOON.